United States Patent [19]

Seino

[11] Patent Number: 5,751,202
[45] Date of Patent: May 12, 1998

[54] ELECTROMAGNETIC COUPLING DEVICE

[75] Inventor: Toshiteru Seino, Kiryu, Japan

[73] Assignee: Ogura Clutch Co., Ltd., Japan

[21] Appl. No.: 709,855

[22] Filed: Sep. 10, 1996

[30] Foreign Application Priority Data

Sep. 6, 1995 [JP] Japan .................... 7-254655

[51] Int. Cl.$^6$ .............. H01F 1/00; F16D 19/00; F16D 27/112; F16D 65/21
[52] U.S. Cl. .............. 335/296; 192/84.941; 192/84.96; 192/200
[58] Field of Search .............. 192/84.96, 84.961, 192/200, 84.941; 335/296

[56] References Cited

U.S. PATENT DOCUMENTS 5,601,168 2/1997 Hayashi et al. .................... 192/55.6
5,601,176 2/1997 Ishimaru et al. .................... 192/200

*Primary Examiner*—J. R. Scott
*Assistant Examiner*—Raymond Barrera
*Attorney, Agent, or Firm*—Reising, Ethington, Learman & McCulloch

[57] ABSTRACT

The electromagnetic coupling device 1 has a one piece armature hub (8) with a central bore attached to a compressor drive shaft (3). Flanges (8b) extend tangentially from the boss (8a) of the armature hub (8). The peripheral edges of the boss (8a) and the flanges (8b) are bent in an axial direction to form a peripheral wall (8c). A portion of the peripheral wall (8c) on the ends of the flanges (8b) form the chamber walls (8d) of damper covers (8e). The chamber walls (8d) have an opening on the side of the damper chamber facing the boss (8a). Rubber dampers (10) are compressed and mounted in each damper cover (8e). Torque pins (11) are mounted in the rubber dampers (10), pass out of the damper covers (8e) and are staked to the armature (12). Projections (8i) can be formed in the flanges (8b) by a press and limit movement of the armature (12) away from the rotor (6).

4 Claims, 4 Drawing Sheets

5,751,202

ELECTROMAGNETIC COUPLING DEVICE

BACKGROUND OF THE INVENTION

1. Technical Field

This invention relates to an electromagnetic coupling device in which an armature is magnetically attracted against the resilient force of rubber dampers, and in particular to an improved armature hub provided with integral damper covers housing rubber dampers.

2. Description of the Prior Art

Conventional electromagnetic coupling devices have been used as devices in which a compressor for compressed gas compression is driven by transmitting the rotational movement of an engine to a rotational shaft by magnetically fastening an armature, which is resiliently supported by rubber dampers on an armature hub, to a rotor linked by a belt to the engine. As proposed in laid-open Japanese application HEI.1-266324, such an electromagnetic coupling device is provided with a stopper plate. The stopper plate comprises a press molded sheet steel article which has formed rubber damper cups attached to its periphery. The stopper plate is secured to the armature hub by rivets. A rubber damper is housed in each rubber damper cup or cover. One end of a torque transmitting member is fixed by vulcanization adhesion in each rubber damper. The other end of each torque transmitting member is secured to the armature supported on the side of the stopper plate opposite the damper cover. The armature is magnetically attracted to the rotor against the resilient force of the rubber damper.

The rubber damper, in a conventional magnetic coupling device, is compressed and then inserted into a damper cover. Since the damper cover has walls that surround the rubber damper, any given portion of the damper cover wall is supplying a force on the torque transmitting member that tends to move the torque transmitting member away from that portion of the damper cover wall. When the armature is magnetically fastened to the rotor, the torque transmitting member compresses the rubber damper in the direction of rotation due to the load transferred by the coupling device. At the same time, the compressed rubber damper on the side of the torque transmitting member opposite the direction of rotation tends to force the torque transmitting member in the direction of rotation. The result of the combined forces tending to move the torque transmitting member in the same direction relative to the damper cover is increased compression stresses in the rubber damper between the torque transmitting member and the damper cover wall in the direction of torque transmission. This increased compression stress increases resilient deformation in the damper rubber and cracks in the rubber damper are liable to occur. Substantial shear stresses between the torque transmitting member and the rubber damper are also created and separation of the torque transmitting member from the rubber damper is liable to occur.

SUMMARY OF THE INVENTION

An object of the invention is to provide an armature assembly with a single piece hub, stopper plate and damper covers. Another object of the invention is to provide an armature assembly with rubber dampers that have improved durability when repeatedly subjected to compression stresses and shear stresses. A further object of the invention is to provide an armature assembly that is light weight and requires minimal space.

In order to achieve the above objectives, the electromagnetic coupling device of this invention has an armature hub with an integral boss mounted on a rotational shaft. A plurality of flanges extend outward from the boss. Peripheral walls of the boss and the flanges are bent in the axial direction. A plurality of damper covers, which are surrounded by chamber walls constituted by the above-mentioned peripheral walls, are formed at the end of the flanges and are open to the boss. Further, the armature hub with this form is integrally formed by pressing in such a way that the chamber walls of the damper covers are open to the boss on the side in which the rubber dampers are pulled. It is also arranged in such a way that substantial resilient deformation does not occur in the rubber dampers in the open area of the damper cover.

The plurality of flanges extend tangentially from the boss in the direction of rotation. The armature hub is formed by pressing in such a way that the chamber walls of the damper covers are open to the boss on the side in which the rubber dampers are pulled. It is also arranged in such a way that substantial resilient deformation does not occur in a rubber damper in the open area in the damper cover.

The rubber damper is placed under an initial spring loading by securing the torque transmitting member to the armature with the armature in contact with projections on the armature hub.

The foregoing and other objects, features and advantages of the present invention will become apparent in light of the following detailed description of an exemplary embodiment thereof, as illustrated in the accompanying drawings.

DESCRIPTION OF THE PREFERRED EMBODIMENT

Figure 1:
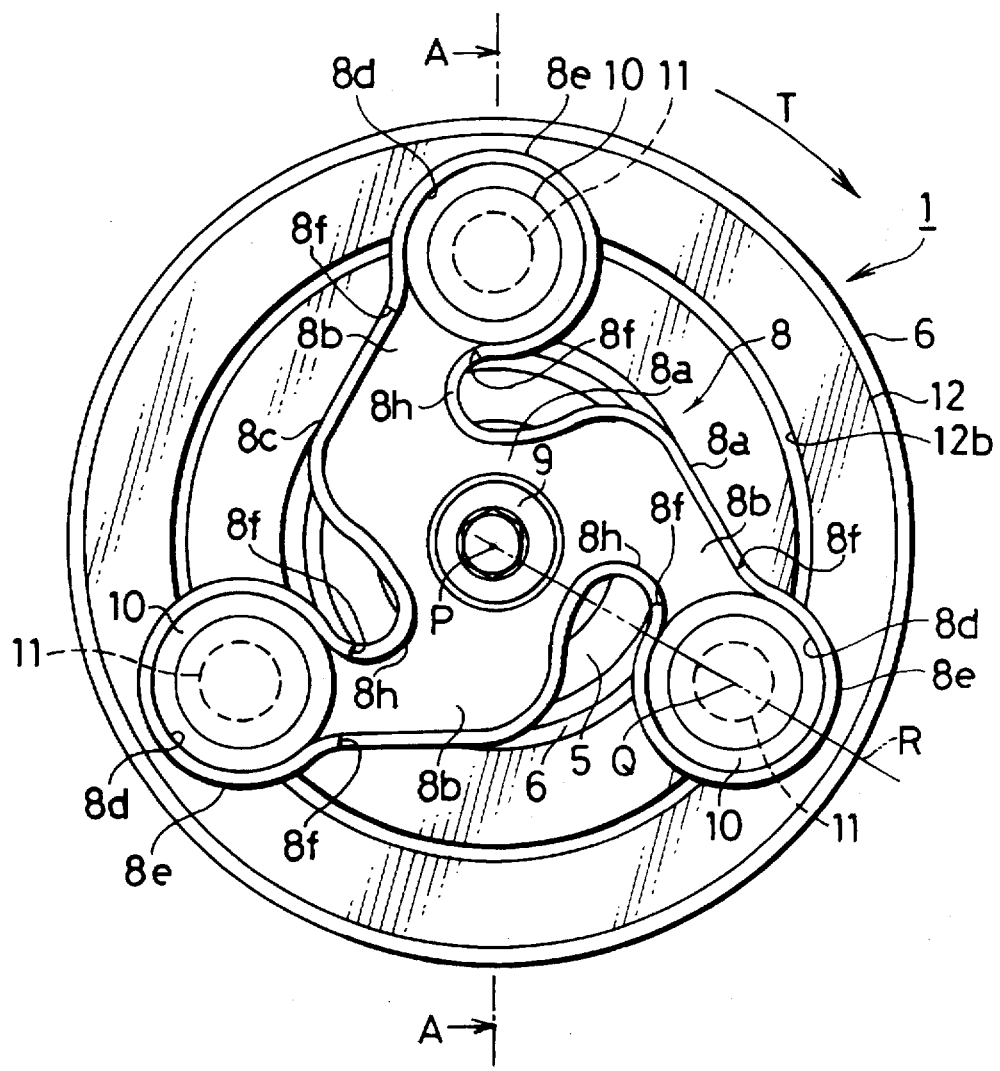
FIG. 1 is a front elevational view of an electromagnetic coupling device of this invention.
Figure 2:
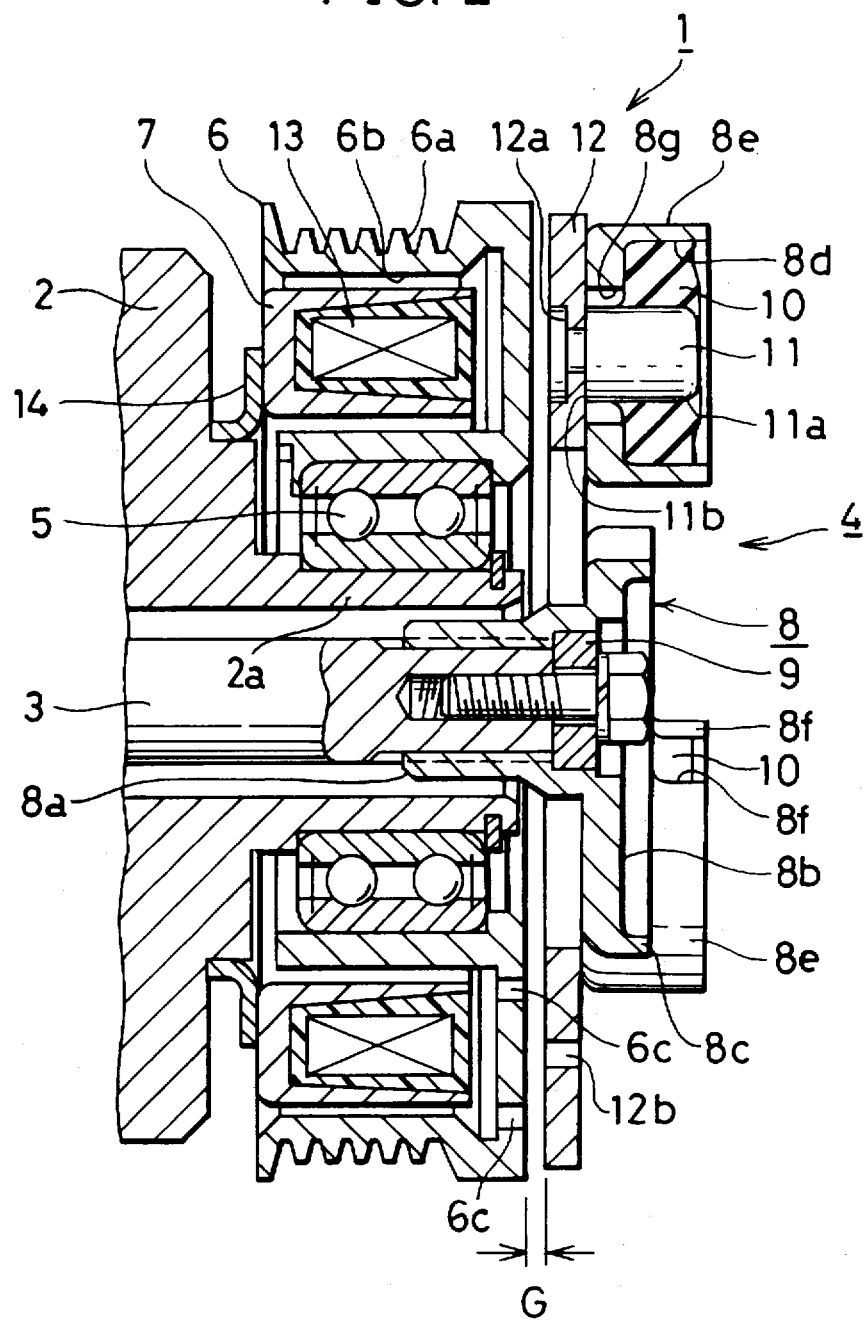
FIG. 2 is a sectional view taken along line A—A in FIG. 1.

The electromagnetic coupling device 1 which is illustrated in FIGS. 1 and 2 is mounted on a compressor 2 for compressing a gas and drives the compressor by transmitting rotational motion from an engine to the compressor. The electromagnetic coupling device or clutch comprises an armature assembly 4 mounted on the rotational shaft 3 of the compressor 2, a rotor 6 rotatably supported by bearings 5 on the cylindrical part 2a of the compressor 2 and a field core 7 supported on the housing of the compressor 2.

The armature assembly 4 with a boss 8a has a splined central bore. The splined central bore receives a splined end of the rotational shaft 3 and rotates with the shaft. Flanges 8b of the armature hub 8 extend tangentially from the boss 8a in the direction of rotation indicated by the arrow T in FIG. 1. An abutment plate 9 is inserted into one end of the central bore through the boss 8a of the armature hub 8 and secured to the boss by staking. However, the abutment plate 9 could be an integral part of the armature hub 8 that is formed during the armature hub forming procedures. A bolt passes through the central bore in the abutment plate 9 and is screwed into a screw hole in the rotational shaft 3 to secure the armature assembly 4 to the rotational shaft. It should be noted that a shim may be interposed between the end of the rotational shaft 3 and the abutment plate 9 in order to adjust an air gap G as discussed below.

The main stages in production of the armature hub 8 are a first stage or step in which the boss 8a and the flanges 8b are integrally formed by the cold forging or hot forging of the raw material. The flanges 8b are formed into the plane form shown in FIG. 1 during the first step. During a second stage or step, the outer periphery of the boss 8a and flange 8b is bent in the axial direction by plastic processing. During a third stage or step, through holes for passage of the torque pins 11 are formed by a cutting process and the outer periphery of the flange 8b is formed into a peripheral wall 8c bent in the axial direction.

The flanges 8b of the armature hub 8 have damper covers 8e on their free ends. The damper covers 8e have damper chamber walls 8d joined to the peripheral wall 8c and are open to the boss 8a. The chamber walls 8d of the damper covers 8e have a greater length, in the axial direction, than the peripheral wall 8c of the boss 8a and the flanges 8b. The peripheral walls 8c are joined to the chamber walls 8d by stepped parts 8f. The thickness of the flanges 8b is set so as to be greater than the thickness of the peripheral wall 8c and the chamber walls 8d.

Cylindrical rubber dampers 10 are compressed and inserted into the damper covers 8e of the armature hub 8 where they are housed under pressure. Torque pins 11 acting as torque transmitting members are adhered by vulcanization in the middle of the cylindrical rubber dampers 10. It will be noted that the arrangement is such that the archshaped beveled area 11a is formed on the head of the large diameter cylindrical portion at one end of the torque pin 11 and this head is embedded in the rubber damper 10.

The rubber dampers 10 are compressed and forced into the damper covers 8e. The small diameter end of each torque pin 11 projects through a through hole 8g through the damper cover 8e in which the rubber damper is mounted. Due to the axial thickness of the boss 8a and the flanges 8b of the armature hub 8, as shown in FIG. 2, the large diameter end surface 11b of the torque pin 11 is well inside the passage 8g when the rubber damper 10 is in a neutral state. During assembly of the armature assembly 4, the small diameter ends of each torque pin 11 is inserted into a bore through the armature 12 and force is applied to the end of the torque pin with the bevelled area 11a until the large diameter end surface 11b engages the armature. The free end of the small diameter portion of the torque pin 11 is then staked in the stepped hole 12a as shown in FIG. 2 while the torque pin is held in place. The rubber damper 10 is thereby provided with a resilient bias that urges the armature 12 toward the flanges 8b. The initial spring loading of the rubber 10 is referred to as a restoring force. The magnitude of the restoring force in the armature assembly 4 is dependent upon the thickness of the flanges 8b. To obtain satisfactory operation the thickness of the flanges 8b must be substantially the same for all armature assemblies. Circular arcshaped slits 12b are provided in the armature 12. These slits 12b are separated by bridges.

The rotor 6 is a member with a channel-shaped crosssection. Belt grooves 6a are formed on the outer circumference of the rotor 6. A poly-v-belt, which is not shown, is trained around the rotor 6 and a drive pulley on an engine or motor. A field core 7 is supported by an attachment plate 14 that is connected to the housing of the compressor 2. The attachment plate 14 is welded to the field core 7 and fixed to the compressor 2. The electromagnetic coil 13 of the field core 7 is inside the ring-shaped channel 6b of the rotor 6 leaving a gap between the rotor and the field core 7. Two series of circular arc-shaped slits 6c are provided in the rotor 6. The arc-shaped slits in each series are separated by bridges.

The flange 8b of the armature hub 8 has formed in it a circular arc-shaped peripheral wall 8h intersected by a hypothetical line R passing through the central point P of the rotational shaft 3 and the central point 2 of the torque pin 11 as shown in FIG. 1. As viewed relative to the hypothetical line R, the chamber wall 8d of the damper cover 8e opens to the boss 8a on the side in which the rubber damper 10 will be pulled. This is the side opposite the direction of rotation T. Consequently, the side of the rubber damper 10 which is compressed (the side in the direction of rotation T) is completely fitted under pressure at the chamber wall 8d of the damper cover 8e.

In the electromagnetic coupling device 1 with a configuration described above, the rotor 6, which is coupled by a belt to an engine, turns and therefore when the armature 12 is magnetically attracted toward the rotor 6 against the resilient force of the rubber damper 10 due to the magnetic pull of the magnetic flux generated by a current passing through the electromagnetic coil 13, rotation of the rotor 6 is transmitted to the rotational shaft 3. The rubber damper 10 of the armature assembly 4 is in the drive torque transmission path and drives the shaft 3 of the compressor 2. Further, because the magnetic flux disappears when the current passed in the electromagnetic coil 13 is cut, the armature 12 separates from the rotor 6, withdrawing toward the flange 8b of the armature hub 8 leaving a gap G, under the resilient force of the rubber damper 10. Then the compressor 2 stops.

Compression stresses and shear stresses will act on the rubber damper 10 due to the repetition of engagement and disengagement of the coupling device and compressor torque variation characteristics. Substantial resilient deformation of the rubber damper 10 due to the compression stress is prevented because the side of the rubber damper 10 which is compressed by the compressor driving torque is under pressure at the chamber wall 8d of the damper cover 8e. The side of the rubber damper 10 in the opening to the flange 8b through the chamber wall 8d of the damper cover 8e exerts minimal compressive force on the torque pin 11. As a result, resilient deformation of the rubber damper 10 is minimized.

Figure 3:
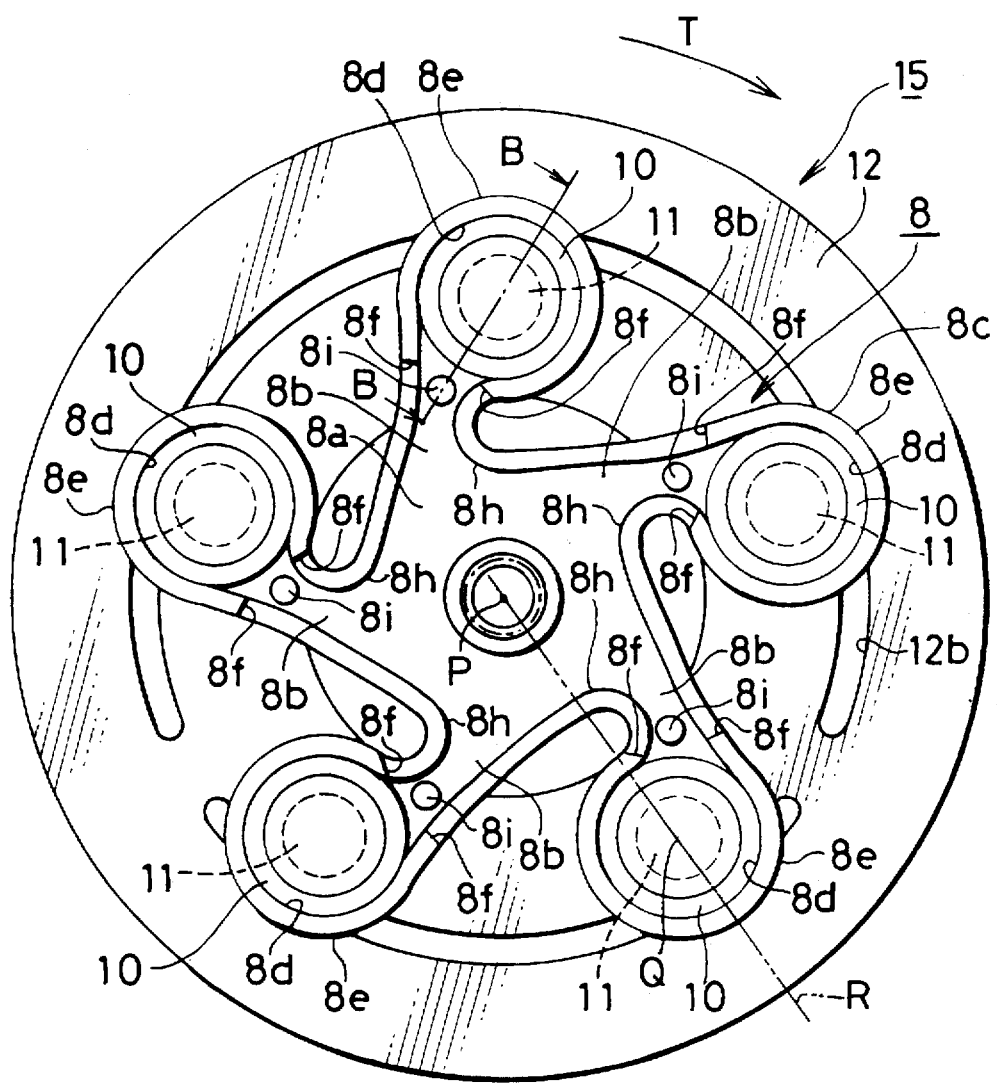
FIG. 3 is a view, similar to FIG. 1, of the electromagnetic coupling device, with five rubber dampers.
Figure 4:
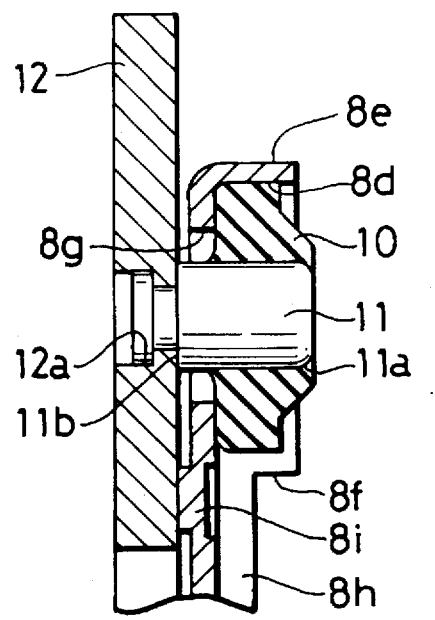
FIG. 4 is an enlarged sectional view taken along line B—B in FIG. 3.
Figure 5:
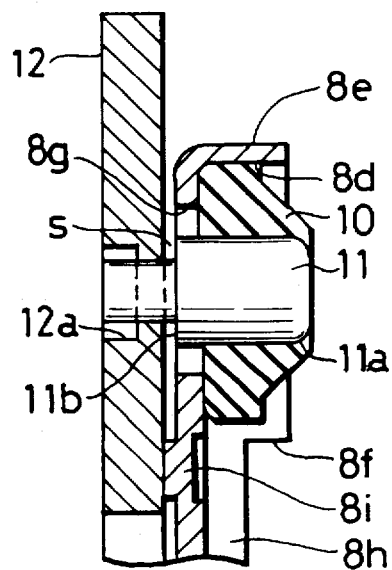
FIG. 5 is a sectional view similar to FIG. 4 before the torque pin is staked to the armature.

An armature assembly 15 with five rubber dampers 10 is shown in FIGS. 3, 4 and 5. The armature assembly 15 which is depicted differs only in that it has five damper covers 8e, and in a way that the initial spring loading of the rubber damper 10 is set. Component parts which are the same as the armature assembly 4 are given the same reference numbers in the figures as have already been used, and explanations of these are not repeated.

In the armature assembly 15, the flanges 8b of the armature hub 8, which is cast, are relatively thin. A plurality of projections 8i (five in the embodiment) are pressed into the thin flanges 8b projecting toward the armature 12. Initial spring loading of the rubber dampers 10 is set by the dimensions of the space S (see FIG. 5) formed between the end surface 11b of the torque pins 11 and the projections 8i on the flanges 8b when the rubber damper 10 is fully inserted into the damper cover 8e and the rubber damper is in a neutral state. During assembly each torque pin 11 is forced toward the armature 12 until the large diameter end portion 11b contacts the armature as shown in FIG. 4. The free end of the small diameter portion of the torque pin 11 is then staked in the stepped hole 12a as shown in FIG. 4 while the torque pin is held in place. The rubber damper 10 is thereby provided with a resilient bias that urges the armature 12 toward the projections 8i. The large diameter end of the stepped hole 12a of an armature 12 faces the rotor 6 in the axial direction and the staked end of the torque pin 11 is recessed in the armature. A predetermined gap G is provided between the armature 12 and the rotor 6 when the armature is in contact with a projections 8i. In other words, the projections 8i projecting toward the armature 12 pressed into the flange 8b, accommodate the reduced thickness dimension of the flanges 8b. Construction of the rubber dampers 10 and the torque pins could be modified to accommodate the reduced thickness of the flanges 8b without forming the projections 8i. Other aspects of the armature assembly 15 and its operation are the same as for the armature assembly 4.

The embodiments described in detail have been provided with flanges 8b extending tangentially, in the direction of rotation, from the boss 8a of the armature hub 8. The ends of the flanges 8b have been formed into damper covers 8e. It is also possible to provide the damper covers on the ends of flanges that extend radially outward from the boss 8a rather than tangentially. Also, the design may be modified, for example, by having damper covers 8e and rubber dampers 10 and torque pins 11 of rectangular cross-section or some other shape. A rubber stopper could also be imposed between the flange 8b and the armature hub 8 and the armature 12.

With the electromagnetic coupling device of this invention, because the armature hub takes a form having a boss mounted on a rotational shaft, a plurality of flanges in which a peripheral wall bent in the axial direction is formed at the periphery, and a plurality of damper covers which are surrounded by chamber walls constituted by the peripheral wall, are formed at the ends of the flanges and are open to the boss, and because the chamber walls of the damper cover are formed integrally by pressing in such a way that they open to the boss on the side in which the rubber dampers will be pulled, it follows that substantial resilient deformation of the damper rubber due to compression stresses is prevented by the opening of the damper cover to the boss, and the durability of the rubber dampers is improved. Also, there is no need to secure a stopper plate to the armature hub by rivets, and a low cost electromagnetic coupling device can be provided.

In addition the electromagnetic coupling device, because the armature hub takes a form having a boss mounted on a rotational shaft, a plurality of flanges in which a peripheral wall bent in the axial direction is formed at the periphery, which are provided extending tangentially from the boss in the direction of rotation, and a plurality of damper covers which are surrounded by chamber walls constituted by the peripheral wall, are formed at the end of the flanges and are open to the boss, and because the chamber walls of the damper cover are formed integrally by pressing in such a way that they open to the boss on the side in which the damper rubbers will be pulled, it follows that the durability of the damper rubber is improved. Also, there is no need to secure a stopper plate to the armature hub by rivets, and a low cost electromagnetic coupling device can be provided.

In addition the electromagnetic coupling device, because the armature hub is a form having a boss mounted on a rotational shaft, a plurality of flanges in which the peripheral wall bent in the axial direction is formed at the periphery, which are provided extending tangentially from the boss in the direction of rotation, and a plurality of dampers which are surrounded by chamber walls constituted by the peripheral wall, are formed at the ends of the flanges and are open to the boss, and because the chamber walls of the damper cover are formed integrally by pressing in such a way that they open to the boss on the side in which the damper rubbers will be pulled, it follows that the durability of the damper rubber is improved. Further, the damper covers can be provided inward in their radial direction and a lighter weight, smaller and less expensive electromagnetic coupling device can be achieved.

Armature contact surfaces 8i formed on an armature hub by a press provide accurate positioning of the armature relative to the abutment plate 9 in the center of the armature hub. The contact surfaces 8i also provide a system for controlling the initial spring loading on the rubber dampers for biasing the armature toward the armature hub. Consequently, it becomes easy to produce an armature hub by pressing and the electromagnetic coupling device can be designed to be lighter in weight. The thickness of the armature hub flanges 8b and boss 8a is not critical and can be changed as required. The thickness of the boss 8a and the flanges 8b can also vary from one armature assembly to another without changing coupling performance. In addition, the contact surfaces 8i provide a space for cooling air to circulate to protect the rubber dampers from heat.

While preferred embodiments of the invention have been shown and described, other embodiments will now become apparent to those skilled in the art. Accordingly, the invention is not limited to that which is shown and described but by the following claims.

What is claimed is:

1. An electromagnetic coupling device comprising an armature hub provided with a boss mountable on a rotational shaft, a plurality of flanges integral with the armature hub with peripheral walls bent in an axial direction on their periphery, and a plurality of damper covers which are internally surrounded by chamber walls constituted by the peripheral walls, are formed at the end of the flanges and are open to the boss in a side of the chamber and peripheral walls that face radially toward an axis of rotation of the boss and the rotational shaft; a plurality of torque transmitting members each having a first end fixed to a rubber damper housed in one of the damper covers and a second free end secured to an armature provided on the side of each of the plurality of flanges opposite one of the plurality of damper covers; a field core provided on its inside with an electromagnetic coil which magnetically attracts the armature against the resilient force of the rubber dampers; and relative to a hypothetical line connecting the center of the rotational shaft and the center of the above-mentioned torque transmitting member, the chamber walls of the damper covers of the armature hub open to the boss on the side in which the rubber dampers will be pulled.

2. An electromagnetic coupling device as set forth in claim 1 wherein projections are formed in the flanges of the armature hub, and the rubber damper is put under an initial spring loading by securing the torque transmitting member to the armature with the armature in contact with the projections.

3. An electromagnetic coupling device comprising an armature hub provided with a boss mountable on a rotational shaft, a plurality of flanges integral with the armature hub with peripheral walls bent in an axial direction on their periphery, each of the plurality of flanges extending tangentially from the boss in the direction of rotation, and a plurality of damper covers which are internally surrounded by chamber walls constituted by the peripheral walls, are formed at the ends of the flanges and are open to the boss in a side of the chamber and peripheral walls that face radially toward an axis of rotation of the boss and the rotational shaft; a plurality of torque transmitting members, having a first end which is fixed to a rubber damper housed in one of the damper covers, and a second end secured to the armature provided on the side of each of the plurality of flanges opposite one of the plurality of damper covers; a field core provided on its inside with an electromagnetic coil which magnetically attracts the armature against the resilient force of the rubber damper; and, relative to a hypothetical line connecting the center of the rotational shaft in the center of the torque transmitting member, the chamber walls of the damper covers of the armature hub open to the boss on the side of the hypothetical line in which the rubber damper will be pulled by torque transmitted to the rotational shaft.

4. An electromagnetic coupling device as set forth in claim 3 wherein projections are formed in the flanges of the armature hub, and the rubber damper is put under an initial spring loading by securing the torque transmitting member to the armature with the armature in contact with the projections.

* * * * *